March 22, 1966 A. GREENFIELD 3,241,206
SAFETY BELT
Filed July 13, 1964 4 Sheets-Sheet 1
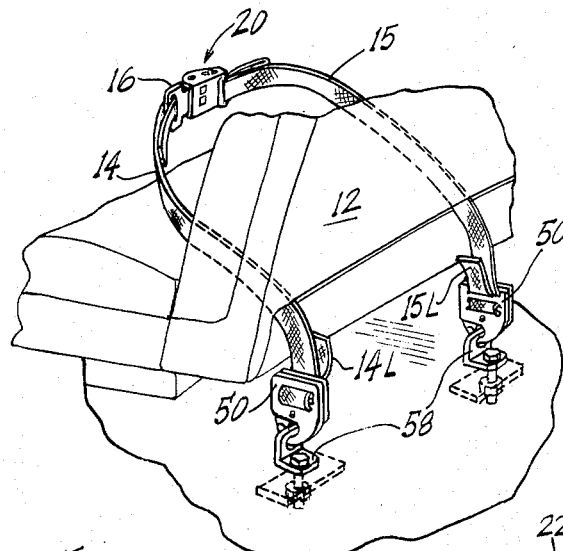
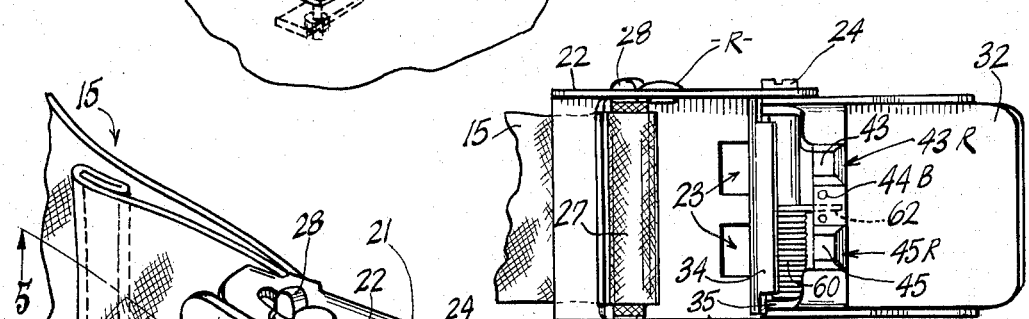
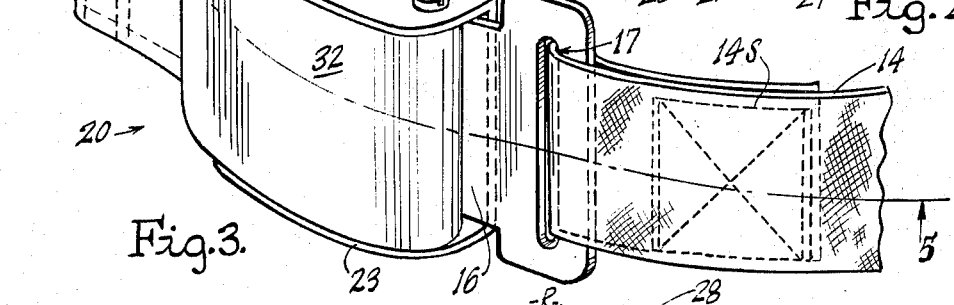
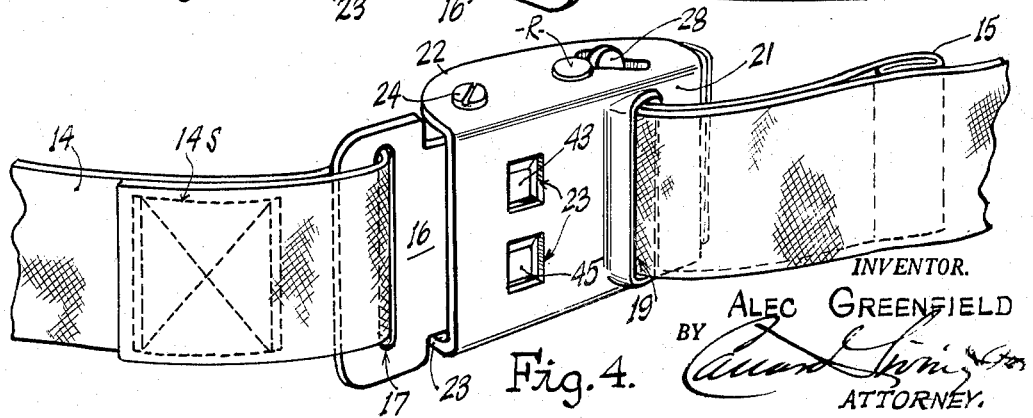
INVENTOR.
ALEC GREENFIELD
BY
ATTORNEY.

March 22, 1966 A. GREENFIELD 3,241,206
SAFETY BELT
Filed July 13, 1964 4 Sheets-Sheet 2
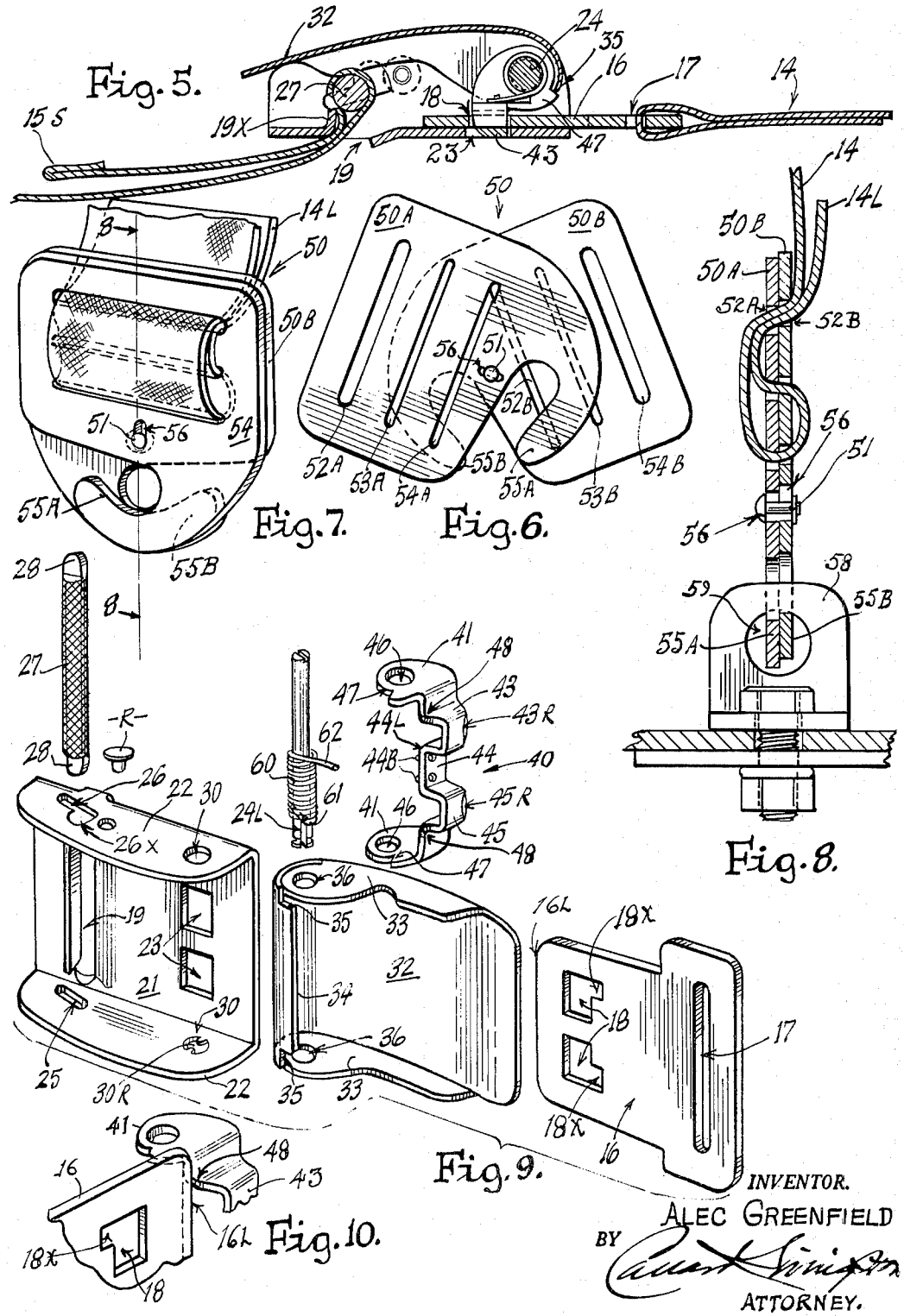
INVENTOR.
ALEC GREENFIELD
BY
ATTORNEY.

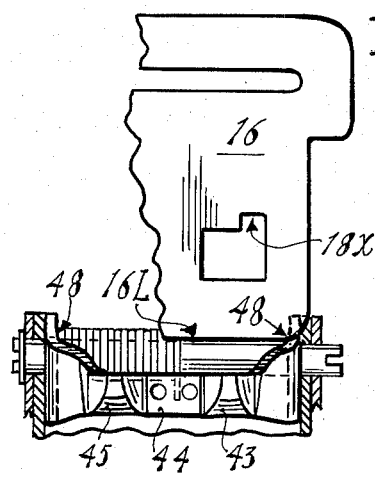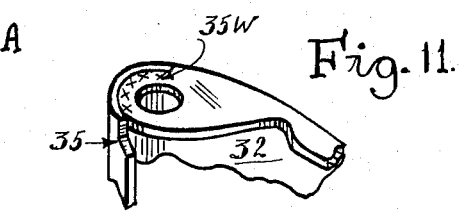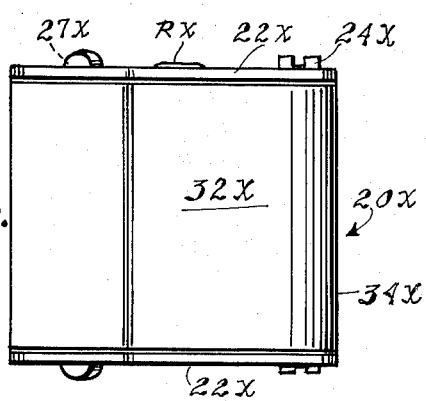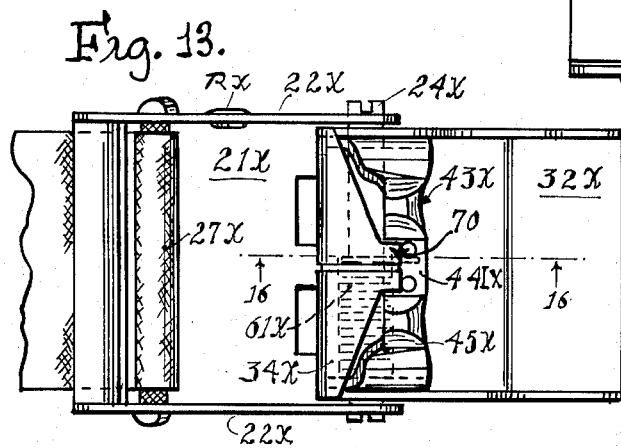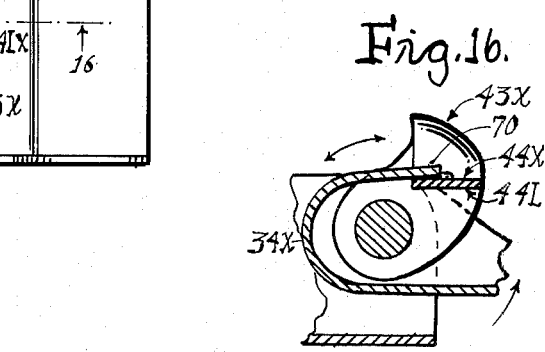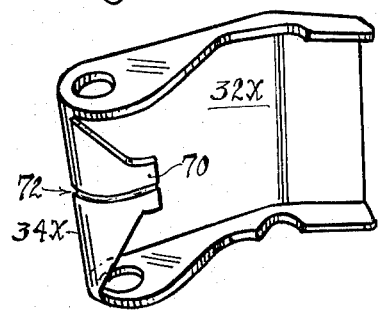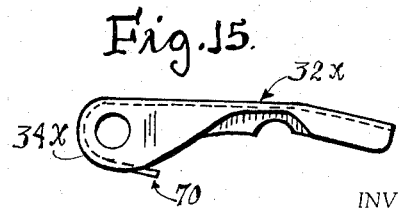

March 22, 1966 A. GREENFIELD 3,241,206
SAFETY BELT
Filed July 13, 1964 4 Sheets-Sheet 4
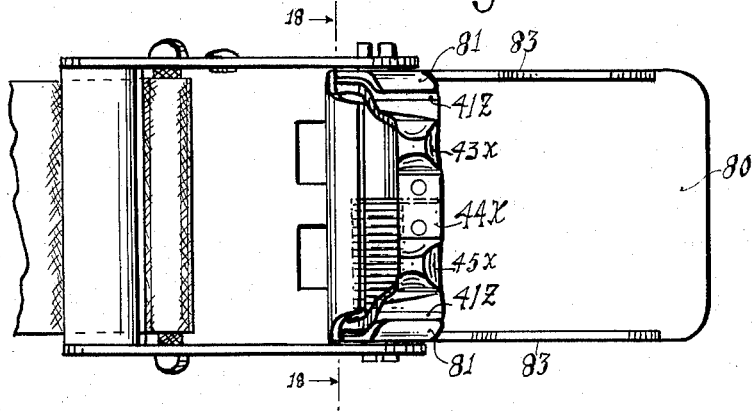
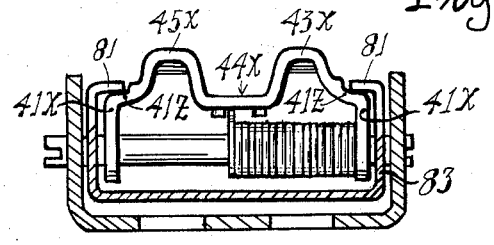
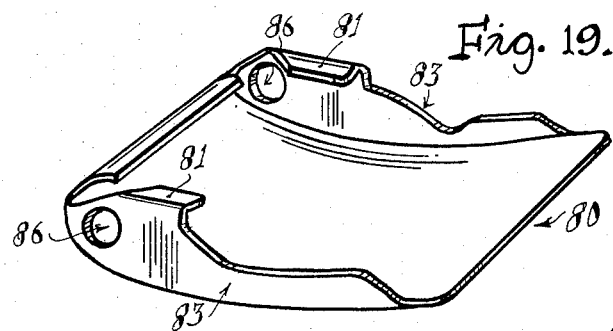
INVENTOR.
ALEC GREENFIELD.
BY
ATTORNEY.

United States Patent Office 3,241,206
Patented Mar. 22, 1966

3,241,206
SAFETY BELT
Alec Greenfield, Chicago, Ill., assignor to The Greenfield Company, Elk Grove Village, Ill., a corporation of Illinois
Filed July 13, 1964, Ser. No. 383,550
16 Claims. (Cl. 24—230)

This application is a continuation-in-part of my pending application Serial No. 120,991, filed June 30, 1961, now abandoned.

This invention pertains to improvements in automobile and aircraft safety belts, and the like, and has as its principal object the provision of a quick-release buckle structure of the two-part metal-to-metal coupling type including a buckle and insertable coupling tongue with a lever release on the buckle, characterized by simplified construction and economy of manufacture and such exceptional strength and reliability, with such ease and smoothness of operation, both in application and release, that it can be manipulated by a small child.

An important feature of improvement relates to the formation of a double latching dog as a single stamping of yoke-shaped configuration with detents of squared character interfitting with especially shaped latching slots in connecting the tongue, whereby great strength and safety factors are economically achieved.

Another feature relates to the provision of certain chamfered camming edges on the one-piece dog which coact with the entering edge of the tongue to cam the dog out of the way for easy and rapid entry of said tongue.

Yet another feature pertains to a method and construction for capturing a belt-jamming pin loosely but permanently in its seat by use of a rivet to block an oversize pin hole.

Still further features pertain to the provision of a cover lever having means in the form of a lifting finger located centrally beneath a central land portion on the bight of the latch dog to lift the latter, or dual fingers located beneath opposite outer lands flanking the central land of the dog for the same purpose, whereby greater mechanical advantage may be had in releasing the dog at a lower opening pressure while permitting use of relatively light gauge metal cover stampings without necessity of welding the corner bends of the cover stamping.

Additional objects and aspects of novelty and utility relate to the provision of an improved shackle means for anchoring the fixed ends of the belt adjacent the vehicle seats, and to details of construction and operation which will appear as the following description proceeds in view of the annexed drawings in which:

FIGURE 1 is a fragmentary perspective detail of a seat and belt installation;

FIGURE 2 is an elevation of the buckle with finger lever open;

FIGURE 3 is a fragmentary perspective view of the front of the buckle in closed condition;

FIGURE 4 is a perspective detail of the rear of the buckle;

FIGURE 5 is a horizontal section through the buckle taken along lines 5—5 of FIGURE 3;

FIGURE 6 is a plan view of one of the self-locking shackles for the belt;

FIGURE 7 is a perspective fragment of one of the shackles with belt applied;

FIGURE 8 is a vertical section through one of the shackles as seen along lines 8—8 of FIGURE 7;

FIGURE 9 is an exploded perspective of the buckle components;

FIGURE 10 is an enlarged perspective fragment illustrating the tongue and detent camming action;

FIGURE 10-A is a fragmentary plan view, partly in section and partly in elevation, of the camming action of the tongue in engaging the latch dog;

FIGURE 11 is a fragmentary perspective view of the cover lever;

FIGURE 12 is a top plan view of a modified buckle;

FIGURE 13 is a plan view of the buckle with cover lever fully open;

FIGURE 14 is a perspective detail of the modified cover lever with central lifting finger;

FIGURE 15 is a side elevation of the cover lever of FIGURE 14;

FIGURE 16 is an enlarged fragmentary sectional detail of the cover lever and latch dog as seen along lines 16—16 of FIGURE 13;

FIGURE 17 is a plan view of a further modification of the buckle with the cover lever fully open;

FIGURE 18 is a sectional detail of the lifting finger construction as seen along lines 18—18 of FIGURE 17;

FIGURE 19 is a perspective view of the modified cover lever with dual lifting fingers seen in plan in FIGURE 17.

The disclosed safety belt, as depicted in FIGURE 1, may be supplied as original equipment or as an applied accessory, and comprises two belt sections or webs 14 and 15 each adjustably attaching at its buckling end to one of the two mating and interlocking buckle parts consisting of an insert or latching tongue 16 and a buckle 20.

The lower ends of each belt web are anchored to the floor by means of improved shackles 50 releasably attaching to anchoring cleats 58 secured beneath or behind the vehicle seats 12.

The latching tongue 16 is a simple metal stamping having the T-form seen in FIGURE 9 with a long web slot 17 formed in the head of the T and substantially square twin detent slots 18 formed in the shank portion thereof, the appertaining belt end being passed through the slot 17 and sewn back against the main web as at 14S (FIGURE 3).

The buckle 20, as viewed in FIGURES 3 and 4, comprises a simple channel-shaped base stamping or frame consisting of a bottom wall 21 and opposite side wall flanges 22 in which is seated a pintle or pivot pin 24 and the flatted ends 28 of a belt-adjustment jam pin 27.

A release lever 32 is pivoted on the pin 24 and normally spring-urged to closed condition, as in FIGURE 3.

The novel manner in which the knurled jam pin 27 is economically seated and secured in position is best understood from FIGURE 9 in which it will be seen that the lower one of the buckle flanges 22 is provided with a long slot 25 pitched toward the plane of the bottom wall, and the upper flange has a matching slot 26 provided with an enlarged outer terminus 26X.

To assemble the jam pin, the lower flatted end 28 is first angled into the lower pitched slot 25 and the pin is cocked so that the upper flatted end can be moved into the enlarged slot terminus 26X, whereupon the pin is worked into place so that the upper flat will enter the narrower part of the slot 26. Thereupon a rivet R is set home adjacent terminus 26X with the periphery of the rivet head projecting into the slot enlargement 26X far enough to prevent the upper flatted pin end 28 from escaping, the assembled pin 27 then appearing as in FIGURE 2.

The elongated slots 25-26 permit sufficient tilting of the jam pin to enable easy freeing of the appertaining belt web 15 for length adjustment, and in this connection web 15 (FIGURE 1) has a plain flat-finished lower end 15L which can be freely passed into the wide buckle slot 19 (FIGURES 2, 4, 5, 9) in the bottom wall of the buckle and thence around the jam pin and back out of the buckle slot, as in FIGURE 5, to be led down to the shackle, the upper or buckle end of the web preferably being turned and stitched as at 15S to prevent escape.

The jamming action of pin 27 is wholly reliable by reason of the diagonal pitching of the slots 25, 26 and the offsetting of the lip 19X on the buckle web slot (FIGURE 5) so that the lip terminates closely opposite the innermost pitched end of the slots, whereby the web binds increasingly on the pin and the lip 19X with increasing load. Yet, the belt web may be quickly freed for length adjustment around pin 27 by simply grasping the exposed flats to move out of jamming position.

A very important feature of the latching means is its ease of manipulation both on insertion and release of the locking tongue 16, this action arising from the form and mode of operation of the special detent dog and the locking slots, the dog 40 (FIGURE 9) being a simple, one-piece stamping of approximately yoke-shaped configuration over all with wide flat opposite side or trunnion arms 41 joined by a wide flat bight portion in which are formed in sinuous fashion three alternately-facing U-shaped bends 43, 44, 45, the middle one of which faces or opens outwardly so as to provide a central, internal land 44L, while the two flanking bends open inwardly of the main bight, and constitute a pair of spaced, prominently-defined detents of square configuration conformed to fit into the registered, square locking slots 18 and 23 in the tongue and buckle respectively.

The opposite trunnion arms 41 of the latching dog are pierced to provide holes 46 receiving the pin 24; and adjacent each pintle hole is formed an abutment or coupling notch 47 cooperable with the release lever, as will appear.

The combination cover and release-lever member 32 (FIGURE 9) is a one-piece stamping providing upper and lower side flanges 33 and a return bend 34 at the top and bottom ends of which are coupling notches or abutments 35 engageable with the dog abutment 47, the side flanges being pierced with pintle holes 36 registering in assembly with the holes 46 of the release lever as well as the pair of pintle holes 30 in the buckle frame, it being noted in FIGURE 9 that the lower frame hole 30 is provided with a pair of diametrically opposite finger projections 30R which key into the lower spring and keying slot 24L in the pintle or pivot pin 24.

In assembled condition, a torsion spring 60 having about half the length of pin 24 is fitted onto the lower part of pintle 24 with one offset end 61 lying in the spring and keying slot 24L and an upper free end 62 projecting as a finger radially at a level (FIGURE 2) to engage the land 44L on the dog, the latter having two spaced guard bosses 44B to prevent escape of this spring finger.

The spring 60 positively returns the cover lever 32 to closed position by reason of the interengagement of the dog abutments 47 and cover notches 35, while at the same time turning the dog home to thrust the square detents 43 and 45 home into the registered slots 18 and 23.

The leading edges 43R and 45R (FIGURES 2 and 9) of the twin dog detents are rounded for smooth entrance and passage of the shank of the insert tongue 16 on insertion, and this action being particularly easy by reason of the configuration and spacing of the wide twin detents 43, 45, their large radial displacement and disposition away from the axis of the dog on pin 24, and their easy fit on entering the squared detent slots 18 and 23.

Conversely, once inserted, the tongue 16 locks up with exceptional resistance to any withdrawal force by reason of the quadruple edgewise abutment of the detents 43, 45 with the doubled thickness of the edges of the registered detent slots, the interfit and interlock being reliably effective in all directions of attempted forced displacement of the tongue. See FIGURES 4 and 5 at 43, 45.

One of the important objectives attained by the new buckle construction is an exceptionally high load capacity with quick and easy operating response in the locking and releasing action of the detent means, and to this end the dog has been provided with tongue camming chamfers 48 (FIGURES 9, 10 and 10-A) at the bend between the trunnion arms 41 and the bight portions 43-45, and so positioned as to be first engaged by the leading edge of the insert tongue, as at 16L (FIGURES 10, 10-A), on entry of the tongue, whereby the tongue does not strike the detents 43, 45 at all, but exerts a camming action against said dog at the chamfers 48, and thereby begins to pivot the dog out of the way much easier than would be the case if the tongue were required to strike and dislodge the detents in order to pivot the dog out of the way for full entry into the buckle passage. The dog is substantially raised, for example, by a push of about ¼ inch on the tongue.

As a further aspect of this easy dog action, the detent slots 18 in the tongue are respectively provided with small corner relief notches 18X (FIGURES 9, 10-A) providing easy clearance for the juxtaposed camming chamfers 48 on withdrawal of the tongue, the opening movement of the dog having the effect otherwise of throwing these cam areas too close to the tongue and thereby narrowing the withdrawal clearance, the notches 18X eliminating this trouble.

The interlocking action of the twin, squared, radially off-set dog detents in the registered square detent slots in two lapped wall thicknesses of metal (i.e. the buckle wall and tongue) affords a relatively enormous load resistance far exceeding the required safety standards under all conditions of operation, and yet, because of the aforesaid camming action at 16L, 48, the insertion of the tongue requires very little angular displacement effort on the dog on entering the registered detent slots or withdrawing therefrom on release, and this results in quick action in both operations and also minimizes the spring force needed in the dog spring 60 to maintain a positive interlock, in further consequence of which little force is needed to move the cover lever 32 to the releasing position, the action in this respect being so facile that any child can operate the buckle.

In addition to the adjustability of the length of the belt section 15 on the buckle, the anchored ends of both webs 14 and 15 are adjustable owing to the novel construction of the shackles 50 as depicted in FIGURES 6 to 8, wherein it will be seen that each shackle comprises a pair of mating plates 50A, 50B pivotally joined by rivet means 51 working in elongated slots 56 which permits the two plates to shift relative to each other along an axis which is radial to the rivet and at right angles to a trio of registerable web slots 52A, 53A, and 54A, and 52B, 53B, and 54B, provided in the respective plates and through which the appertaining belt web is threaded, as in FIGURES 7 and 8.

Before attaching the webs to the shackles, the latter are hooked onto the floor cleats 58, as in FIGURES 1 and 8, this being done by pivoting the plates to spread open their respective opposed hooks 55A, 55B, as in FIGURE 6, and passing these hooks into the cleat opening 59 (FIGURE 8) and then closing the hooks so that the web slots 52A-B, 53A-B, 54A-B, in the pair of plates are in registry to receive the belt web, which is threaded into the same in the manner depicted in FIGURE 7, in consequence of which the shackle plates are secured against relative pivotal movement, so that the hooks cannot again open or escape the cleat, but the two plates can nevertheless shift slightly in an axial sense tending to throw the web slots out of alignment, as illustrated in FIGURE 8, particularly, in response to a pull on the belt from the direction of the seat. This pull and axial shift of the shackle plates causes the threaded web to be seized with increasing firmness and a locking action in proportion to the force of the pull, yet the plates can be easily shifted back into registry in case it is necessary to change the length of the belt. The reverse threading of the web through the three shackle slots, as in FIGURE 8, is also sufficient to prevent any slippage of the anchored end of the belt under no-load conditions.

In accordance with current standards and legal requirements, the buckle should release under a force applied on the belt is at least 150 lbs. after application of a shock load of 5,000 lbs. to the belt and buckle. In general, the lower the release effort the better for quick and easy opening under emergency conditions, it being understood that the spring effort closing the latch dog must be sufficient to withstand the 5,000-lb. shock load. Accordingly the spring action on the dog is generally quite stiff and the cover lever is stressed along the points of driving or coupling engagement between the dog and cover lever, for instance at the notched corners 35 in the embodiment of FIGURES 2, 8, 9, in consequence of which it becomes necessary to strengthen the formed-over corner portions of the cover stamping by welding (at at 35W, FIGURE 11) unless heavy gauges of metal are employed, such expediencies being costly in several respects.

A modified buckle construction, such as depicted in FIGURES 12 to 16, eliminates the short-radius, edge-to-edge lever action at the corner notches 35 of the form of cover shown in FIGURE 9, and utilizes the long lever arm or finger 70, which is an extension projecting integrally from the rearwardly curved part 34X of the cover stamping, said finger or tongue projecting around the pivotal axis beneath and upwardly into and against the bight portion constituting the U-shaped recess or depression or bend 44X in the middle of the dog between the two detents.

As a result of the modified construction, a lifting and sliding cam-like action between the dog and cover lever is achieved which is capable of responding to an opening test pressure of as little as 17 lbs. on the modified construction.

The modified buckle in other respects is essentially identical in principle and construction to the form of FIGURES 3 to 10, except that it is somewhat smaller over-all and of course employs the aforesaid dog-lifting tongue lever for lifting the latch, such construction being particularly described with respect to parts which are identical to those of the first-described embodiment by use of similar reference characters having the suffix X attached thereto.

Thus, referring to FIGURES 12 through 16, the smaller buckle 20X comprises a channel-shaped base stamping having a bottom well 21X and opposite side flanges 22X supporting the pivot pin 24X and a jam pin 27X substantially identical to the arrangement of FIGURES 3 and 4, together with a combination cover plate and release lever 32X pivoted on pin 24X coaxially with the dog and normally closed through spring action on the dog in particulars to be explained, the construction, assembly and action of the jam pin 27X and retaining rivet means RX being identical to that previously described.

As viewed in FIGURES 13, 16 the latching dog 40X is likewise substantially identical to the dog 40 with the exception that the notched coupling portions 35 are omitted, the construction otherwise being characterized by inclusion of the same three sinuous bends 43X, 44X, 45X with the central land 44LX receiving the closing thrust of the spring end 61X on the upper face thereof.

Means for intercoupling the modified cover lever and dog comprises the provision of a finger 70 (FIGURES 13 through 16) constituting an extension of the return bend 34X of the cover stamping and directed back beneath the central bend or bight portion 44X of the dog in such relation as to rise glidingly against the underside of the latter (i.e. beneath the land 44LX) to lift the dog to released position responsive to a co-directional lifting of the cover plate, the application of the lifting force being at a point radially beyond the pivot axis in the direction of entry of the belt tongue.

In order to further strengthen the dog-lifting finger 70 where lighter gauges of stamping metal are used, said finger 70 is provided with stamped rigidifying means in the form of rib 72, it being apparent that the stresses from the dog-moving action are distributed more widely over the expanse of metal of which the lifting finger 70 is an integral part. It will also be seen that the finger constitutes a long lever arm with endwise surface parts tending to glide on the dog during the lifting action, as distinguished from the edge-to-edge thrust which occurs in the notched coupling action at 35 in the embodiment of FIGURE 5, and which stresses the corner bends of the cover to the extent of requiring reenforcement as by the welding of these corner bends unless objectionably heavy cover stock metal is employed.

In accordance with still further modifications of the cover-lever and dog coaction, as depicted in FIGURES 17 through 19, the sinuous, one-piece form of the latching dog is further taken advantage of for increased easy-operating leverage without resort to the expense and heavy forming requirements involved in the use of heavier gauge metal stock or reinforcing involving use of the corner-welding expediency at 35W or the stiffening deformations or rib means 72, such further modifications also eliminating the edge-to-edge notch interaction at 35 (FIGURE 5) and employing the gliding and lifting action which characterizes the lifting finger 70 of the construction of FIGURES 14 and 16, but differing from the latter by dividing the lifting load between two in-turned fingers which respectively rise against the outermost bends of the bight on the dog which adjoin the trunnion arms thereof, as will further appear.

The modified buckle of FIGURE 17, like that of FIGURE 12, is contrived to follow the trend toward lighter-weight and smaller equipment while affording all of the easy-opening and ruggedly strong characteristics of the larger and heavier construction exemplified by the device of FIGURES 2 through 9, the buckle of FIGURE 17 being identical to that of FIGURE 12 except for the formation of cover lever 80 and the location of the dog-lifting finger means thereon, said cover lever as seen in FIGURE 19 having a pair of lifting fingers 81 turned inwardly from the side walls 83 of the cover stamping, said fingers being situated at a distance radially outward of the pivot hole 86, and therefore of the pivotal axis of the lever, at a distance to underlie and rise against the bight portions 41Z of the dog which adjoin the respective trunnion arms 41X thereof, as in FIGURE 18, the latter being the cross-sectional counterpart of the condition of these same parts as seen in the fully opened condition of the buckle depicted in FIGURE 17.

The co-action of the dual lifting fingers 81 with the dog in the embodiment of FIGURES 17 and 18 is functionally similar to that of the single, centrally-disposed lifting finger or tongue 70 in that a smooth gliding interaction occurs between the surface-to-surface interfaces of the lifting fingers and the bight portions 41Z and at points radially outward of the pivotal axis of the cover and dog which can afford a greater mechanical advantage than the short-radius notch abutment action at 35, 47, as in the arrangement of FIGURE 5, it being possible in this connection to locate the lifting fingers 81 and the bight portions 41Z at increased radial distances from the pivotal axis, if desired, by carrying the metal stock on both the cover side walls and the bight portion of the dog forward (i.e. radially farther outwardly from the axis) as necessary.

The standard shock-loading test at 5,000 lbs., dropped at once to 150 lbs., stresses and tends to deform critical parts of the buckles, particularly the cover levers, with the usual result that opening pressures are significantly higher after shock loading than before. For example, the modified releasing means employing the lifting fingers can open at low as 10 lbs. against a 150-lb. belt load before application of the shock load, or at 17 lbs. after shock load as compared with 19 lbs. for the larger and heavier buckle construction of FIGURE 2.

I claim:
1. In a safety-belt buckle structure of the type having a buckle member receiving a latching tongue into an end thereof beneath a combination cover and releasing lever pivoted on the buckle member, and a latching dog co-pivotally mounted with the cover lever and spring-urged into a normal position for latching engagement with the tongue, and cooperative with the cover lever such that predetermined opening movement of the cover lever will move the dog into tongue-releasing condition, improvements comprising, namely: a latching dog in the form of a one-piece stamping consisting of a pair of trunnion arms joined by a bight in which is formed a sinuous bend with offsets defining two U-shaped detents spaced from each other and each spaced from one of the said trunnion arms; a pivot pin carried by the buckle member and engaging in said arms; that portion of the bight intervening between the two detents affording a land on one side of the bight; spring means carried on said pin and having a portion bearing in spring action against said land to urge the dog into said normal latching position at a point substantially radially outward of the pivotal axis of the dog.

2. A dog construction according to claim 1 further characterized in that said land is provided with a pair of spaced bosses upstanding thereon to flank said spring portion and limit substantial sidewise displacement of the latter.

3. A dog construction according to claim 1 further characterized in that the degree of offset of the bend constituting the land is closer to the pivot pin than the outer margins of said detents radially remote from the pin, so that said spring portion bearing thereon may extend without bending approximately tangentially from the pin on which it is carried into operative engagement with the dog and at a level substantially above and free from interference with the in and out movement of the latching tonque beneath the detents.

4. In a safety buckle structure, a buckle having a channel-shaped base with a cover lever pivoted thereon in spaced relation to the bottom wall of the channel; a coupling tongue insertable into said channel between said wall and lever to lie substantially flush against said wall, said tongue and wall each having a pair of mutually matching detent slots therein of substantially square configuration and each said pair being spaced apart side-by-side laterally across the direction of movement of the tongue in said passage and adapted to lie in registry when the tongue is fully inserted in said passage; and a locking dog pivoted on the buckle coaxially with the lever and coupled with said lever for joint pivotal movement therewith; spring means urging the coupled lever and dog into a normally closed condition in a direction toward said bottom wall and the detent notches therein; said dog comprising a one-piece stamping of approximately yoke-shaped configuration including opposite trunnion arms embracing the pivotal axis for joint pivotal action with the lever as aforesaid, and a bight portion sinuously bent to provide two radially offset detents each having a configuration of squared character interfitting with said detent slots when registered as aforesaid, whereby to interlock the tongue and buckle with great strength by engagement of the squared parts of the detents with the lapped thicknesses of the square slots in the tongue and buckle.

5. The construction defined in claim 4 further characterized in that said dog is provided with camming surface formations which are engageable by leading edge portions of said tongue on entry and which are located closer to said pivotal axis than are said detents, whereby the tongue on entry first engages said camming formations in advance to pivot the dog rapidly out of said normal condition to permit full and easy entry of the tongue and spring-urged return entry of the detents into said detent slots on coming into registry as aforesaid.

6. In a safety belt of the type employing a tongue insertable into a lever-release buckle having a latching dog normally spring-urged into a latching position with detent means to engage in perforations in the tongue and adapted to be pivoted into released position by movement of the lever, improvements comprising: the provision of a dog structure having sinuously-displaced edge portions confronting the leading margins of the entering tongue, said edge portions being provided with camming formations at certain points by means of which the dog is cammed out of the way by the entering tongue, said tongue having perforate slot means to receive said detent means, and said slot means including a corner notch affording a clearance for said camming formations in release movement of the dog to facilitate withdrawal of the tongue.

7. A construction according to claim 6 further characterized in that said slot means comprises at least two pairs of perforations, one in the buckle member and one in the tongue and adapted to register in the inserted condition of the tongue, the slots of each pair being respectively located on opposite sides of a median line extending in the direction of movement of the tongue into and out of the buckle; said dog having a corresponding pair of detent portions each enterable into one of the registered sets of notches of said pairs when the tongue is inserted, said camming formations on the dog being provided in two positions each aligned with one of the slots in the tongue and both of said tongue slots being provided with contiguous clearance notches for accommodation of the camming formations on release movement of the dog as aforesaid.

8. In a safety belt buckle structure comprising a buckle member and a tongue member insertable into the end of a buckle member and automatically latched therein by a spring-urged dog, improvements comprising, namely: a buckle member having a bottom wall, a tongue entering the buckle member at one end and fitting substantially flat against said bottom wall, said wall and tongue having registering pairs of detent slots to receive dog detents when the tongue is inserted; a pivot pin extending across the buckle member near the entering end thereof receiving the tongue; a latching dog having a pair of trunnion arms connected by a flat bight, each arm pivotally engaging said pin, together with a pair of offsets formed in said bight and each spaced from one of said arms and from each other to provide a recess centrally of the bight, said detents each fitting into a registered pair of said slots to latch the tongue in the buckle member, said detents having a U-shaped configuration on the leading side thereof confronting the entering margins of the tongue, together with an arcuate rearward surface oppositely remote from said leading side and facilitating the closing entry of the detents into the registered slots as aforesaid and the reverse action on withdrawal of the tongue; spring means urging the dog into latching position; and lever means carried by the buckle member and operable to move the dog into tongue-releasing position.

9. A buckle construction according to claim 8 further characterized in that said lever means comprises a cover for the buckle member shielding said dog, said cover being pivotally mounted on said pin and having an extended integral portion recurving around and back beneath said pin and providing a tongue engageable with the dog in said recess beneath the central part of the bight and operable as a lever on lifting of the cover lever to apply a lifting force to the dog at a point substantially radially displaced from the pivotal axis of the dog and at an elevation in the recess always clear of the tongue to lift the dog pivotally and clear said detents from said slots.

10. In a safety belt buckle of the type having a pivoted latching dog cooperable with a locking tongue insertable into the buckle, and a combination pivoted cover and dog releasing lever, improvements comprising: a dog in the form of a one-piece stamping from flat stock having opposite flat trunnion arms in parallel planes and respectively engageable with pivot means on the buckle, said arms being connected by a bight portion having flatness in a plane at right angles to said arms with a plurality of offsets defining a pair of latching detents each spaced inwardly of the bight from one of said trunnions and from each other so as to provide a spring land and a central recessed part on the underside of the dog between the detents; spring means acting upon said land and urging the dog into a latching position; and a cover lever pivoted coaxially with the dog and having a rearward recurved tongue constituting a long lever arm extended beneath and into said central recessed part with an end portion slidingly engageable with the dog thereat and acting to lift the dog in pivotal release action responsive to opening movement of the cover lever, said tongue being directed upwardly into said recessed part away from the floor of the buckle with clearance for entry and withdrawal of the tongue.

11. A safety belt buckle and tongue assembly comprising a buckle member having a pivoted cover, a coupling tongue member insertable into an end of the buckle member beneath said cover and the pivotal axis thereof; a spring-urged latching dog copivotally mounted with said cover and operable to latchingly engage the tongue on insertion into the buckle member as aforesaid; and means for releasing the dog responsive to opening movement of the cover, said means comprising an integral lever extension of the cover turned back around and beyond the pivotal axis of the cover beneath the latter and beneath the dog to engage the latter in a lifting action at a point thereon radially away from the pivotal axis of the dog in the direction of entering motion of the tongue, whereby pivotal lifting of the cover will cause co-directional lifting of the dog pivotally into tongue-releasing condition.

12. In a safety belt structure, a buckle member having a release lever and a latching dog copivotally mounted, and spring means urging the dog to a latching condition, a buckle tongue insertable into an end of the buckle member beneath said lever and dog and having detent formations automatically engaged by the dog when the tongue is fully inserted, said dog being in the form of a one-piece member having opposite trunnion arms joined by a bight in which are formed sinuous bends defining a pair of detents spaced from each other to define a central land on the bight, and each spaced from one of said trunnion arms to define respective outer lands; and finger means forming an integral finger extension of the release lever and projecting beneath the dog and the pivotal axis thereof to underlie at least one of said lands and bear liftingly against the latter on release movement of the lever to lift the dog from latching condition and free said tongue.

13. A construction according to claim 12 further characterized in that said finger extension is located centrally of the release lever and bight portion of the dog to underlie the central land on the latter for lifting action as aforesaid.

14. A construction according to claim 12 further characterized in that said finger extension comprises a pair of inturned projections from the release lever each respectively underlying one of said outer lands of the bight portion on the dog for lifting action as aforesaid.

15. In a safety belt buckle of the type having a buckle member and a belt tongue to be latched therein, a tongue-latching dog pivoted on the buckle member, a combination cover plate and dog-releasing lever pivoted on the buckle member, said dog being in the form of a one-piece member consisting of opposite trunnion arms joined by a bight forming an outer land adjacent each said arm with portions of said land extending away from the pivotal axis of the dog through said trunnion arms, said cover lever having opposite side walls coaxially pivoted with the dog, said side walls each having an offset finger projection underlying one of said outer lands to bear against the same and lift the dog free from latching relation with said tongue responsive to opening movement of the cover lever and spring means normally acting to dispose the dog in a latching condition for coaction with said tongue and to urge said cover lever in a closed relation to the buckle member.

16. In a safety belt buckle, a buckle frame having a combination cover and release lever pivoted thereon and adapted to receive a belt tongue insertably in one end thereof beneath said lever, a latch dog copivotally mounted with the cover lever and spring means urging the dog to latchingly engage with an inserted tongue, said dog consisting of a unitary member having a pair of side arms pivotably supporting the same as aforesaid, said arms joined by a bight portion which is located substantially radially away from the pivotal axis through said side arms, said bight having a series of bends defining two detents spaced apart along a line parallel to said axis and defining between them a central land and a recess; said bends also defining an outer land near each said side arm; said spring means including a part bearing against said central land; and means comprising at least one finger projection constituting an integral projection from said cover lever projecting beneath one of said lands to engage the same at a point radially away from said axis in the direction of entering movement of said belt tongue to lift the dog responsive to lifting the cover lever.

References Cited by the Examiner
UNITED STATES PATENTS 2,964,815 12/1960 Serend.
3,013,317 12/1961 Weber.
3,078,538 2/1963 Brown.
3,104,440 9/1963 Davis.

WILLIAM FELDMAN, *Primary Examiner.*

B. A. GELAK, *Assistant Examiner.*